(No Model.)

H. J. BREWER.
GALVANIC BATTERY.

No. 443,219.  Patented Dec. 23, 1890.

Witnesses:
Geo. W. Miatt
D. W. Gardner

Inventor:
Horatio J. Brewer
By his attorneys
Dickerson Brown Foster & Freeman

UNITED STATES PATENT OFFICE.

HORATIO J. BREWER, OF NEW YORK, N. Y.

GALVANIC BATTERY.

SPECIFICATION forming part of Letters Patent No. 443,219, dated December 23, 1890.

Application filed June 16, 1890. Serial No. 355,582. (No model.)

*To all whom it may concern:*

Be it known that I, HORATIO J. BREWER, of the city, county, and State of New York, have invented a new and useful Improvement in Galvanic Batteries, of which the following is a full, true, and exact description, reference being had to the accompanying drawings.

This invention relates to an improvement in what are commercially known as "dry batteries," being batteries in which the electro-motive force is derived from chemical action without the presence of any free liquid. Certain parts of my invention are, however, applicable to wet batteries as well.

My invention will be readily understood from the accompanying drawings, in which—

Figure 1:
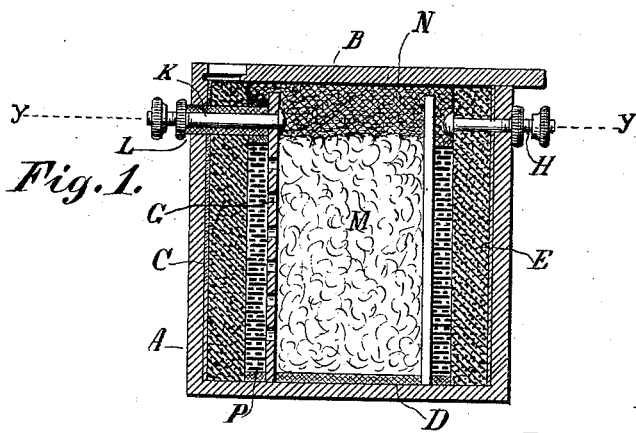
Figure 2:
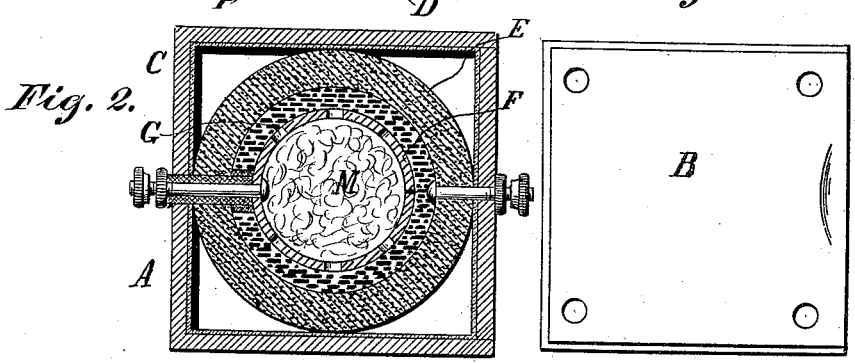
Figure 3:
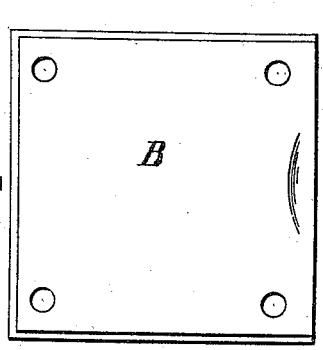
Figure 4:
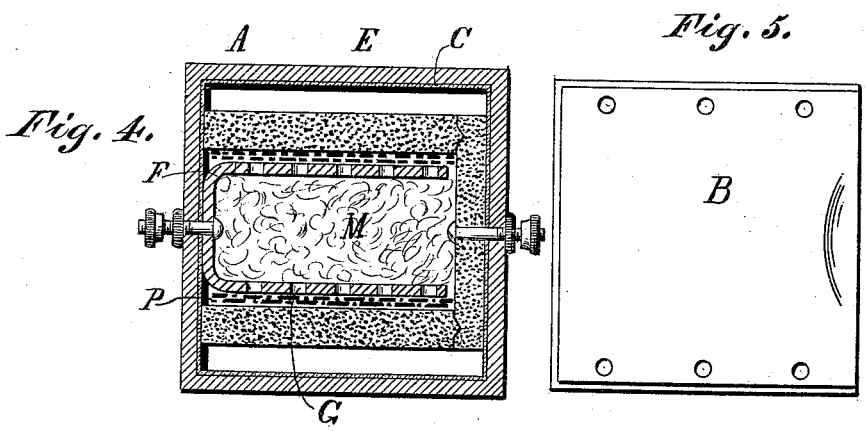
Figure 5:
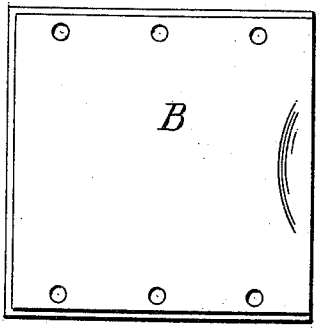

Figure 1 represents a vertical section; Fig. 2, a horizontal section through Fig. 1 on the line $y\ y$; Fig. 3, a view of the cover of the box of Fig. 1; Fig. 4, a view of a modified arrangement; and Fig. 5 a view of its cover.

A represents a box, ordinarily made of wood, inclosing the cell; and B the cover, which may fit therein by sliding in grooves or in any other suitable way.

In making up my cell, as exhibited in Figs. 1 and 2, I proceed as follows: I line the sides of the box with a coating C of suitable waterproof material—for instance, asphaltum, a layer of which in its soft condition may likewise be arranged in the bottom of the box, as at D. In this is embedded the carbon cell or cylinder E, which, being placed in the asphaltum while hot, is sealed in the same at its bottom. Centrally located with reference to the carbon cylinder E is the zinc cylinder F, provided with perforations G, which is also by preference sunk and sealed in the asphaltum bottom. Between the zinc and carbon cylinders I place the exciting compound P, which is preferably made with sulphate of lime, seventy-eight per cent.; chloride of zinc, twenty per cent., and glycerine, two per cent. In the carbon cylinder I arrange the connection H, as shown, and in the zinc the connection K, which is of course carried out through the carbon through a suitable insulator, as at L. Within the zinc cylinder I place the absorbent cotton M, serving as an absorbent of water placed therein, which may pass through the zinc to the exciting material. I then seal the top of the jar with paraffine, as at N.

In Fig. 4, the arrangement is substantially the same as in Fig. 2, excepting that the cylinders are horizontally placed, and the zinc and carbon cylinders have closed ends. By the arrangement shown of the exterior carbon cylinder the proportion between carbon and zinc is much better than is usually the case in similarly-constructed cells.

I do not limit myself in my arrangement of carbon and zinc to the presence of a solid or semi-solid exciting material between them, the said arrangement being applicable as well to wet as to dry batteries. The absorbent material M performs the function of maintaining the exciting material moist by supplying water to it as the same evaporates or is decomposed. Instead of placing the absorbent material (which may be cotton or other suitable material) within the zinc, I may place it likewise outside of the carbon in the spaces shown, when the moisture will pass through the carbon to the exciting material.

What I claim as my invention, and desire to secure by Letters Patent, is—

1. The combination of a carbon cylinder and a zinc cylinder concentrically arranged and having their open ends embedded in a sealing body of insulating material, substantially as described.

2. The combination of an electro-negative and electro-positive pole and an exciting material consisting of a compound of sulphate of lime, chloride of zinc, and glycerine, substantially as described.

3. The combination, in a dry cell, of cylinders of carbon and zinc concentrically arranged and an internal body of absorbent material, substantially as described.

4. The combination of the carbon cylinder E, the zinc cylinder F, the interposed exciting material, and the absorbent material M, substantially as described.

5. The combination, in a dry battery, of a body of solid or semi-solid exciting material and an absorbent material containing moisture, such as water, arranged in proximity thereto and adapted to supply the same to
5 the exciting material, substantially as described.

In testimony whereof I have signed my name to this specification in the presence of two subscribing witnesses.

HORATIO J. BREWER.

Witnesses:
ANTHONY GREF,
WM. A. POLLOCK.